US007857470B2

(12) United States Patent
Nishi et al.

(10) Patent No.: US 7,857,470 B2
(45) Date of Patent: Dec. 28, 2010

(54) LIGHT REFLECTING PLATE AND METHOD OF MANUFACTURING THE SAME, AND LIGHT REFLECTING DEVICE

(75) Inventors: Mari Nishi, Kudamatsu (JP); Mitsuyoshi Ohba, Kudamatsu (JP); Tatsuya Ohshima, Kudamatsu (JP)

(73) Assignee: Toyo Kohan Co., Ltd., Tokyo (JP)

( * ) Notice: Subject to any disclaimer, the term of this patent is extended or adjusted under 35 U.S.C. 154(b) by 0 days.

(21) Appl. No.: 12/618,191

(22) Filed: Nov. 13, 2009

(65) Prior Publication Data

US 2010/0053785 A1 Mar. 4, 2010

Related U.S. Application Data

(63) Continuation of application No. PCT/JP2008/060516, filed on Jun. 9, 2008.

(30) Foreign Application Priority Data

Jul. 23, 2007 (JP) ............................ 2007-190877

(51) Int. Cl.
*G02B 5/08* (2006.01)

(52) U.S. Cl. ...................................................... 359/883

(58) Field of Classification Search ................. 359/838, 359/883, 599, 601
See application file for complete search history.

(56) References Cited

U.S. PATENT DOCUMENTS

2006/0153979 A1 * 7/2006 Asakura et al. ............. 428/141
2007/0253064 A1 * 11/2007 Ookubo et al. .............. 359/599

FOREIGN PATENT DOCUMENTS

| | | |
|---|---|---|
| JP | 58-93101 | 6/1983 |
| JP | 09-120705 | 5/1997 |
| JP | 10-142407 | 5/1998 |
| JP | 2000-149627 | 5/2000 |
| JP | 2001-174803 | 6/2001 |
| JP | 2005-275029 | 10/2005 |
| JP | 2006-228508 | 8/2006 |
| JP | 2007-140201 | 6/2007 |
| JP | 2007-178998 | 7/2007 |
| WO | 2005-081021 | 9/2005 |

* cited by examiner

*Primary Examiner*—Euncha P Cherry
(74) *Attorney, Agent, or Firm*—Bacon & Thomas, PLLC

(57) ABSTRACT

Provided is a light reflecting plate capable of reducing glare of reflected light while maintaining high light reflectance by regular reflection. The light reflecting plate includes a base, a light reflecting layer that is formed on the base and made of silver or silver alloy, or aluminum or aluminum alloy, in which arithmetic average roughness (Ra) is 0.10 to 0.30 μm and arithmetic average waviness (Wa) is 0.30 to 2.50 μm on a surface of the light reflecting layer.

15 Claims, 9 Drawing Sheets

101
14
13a
13
11a
11

Regular Reflectance (%)
100
90
80
60
0
B1 A1
A3
A4
A7
A2 B2
A5
A6
B3
B4
Arithmetic Average Waviness Wa (μm)
o 0.05~2.50
● 3.20
0 0.2 0.4 0.6 0.8 1.0
→ Arithmetic Average Roughness Ra (μm)

FIG.3

| Sample Number | Substrate | Binder Layer | Light Reflecting Layer | Surface Texture of Light Reflecting Layer ($\mu m$) | | Reflection Characteristics | | Evalution |
|---|---|---|---|---|---|---|---|---|
| | | | | Arithmnetic Average Roughnss | Arithmnetic Average Waviness | Regular Reflectance | Light Reflected and Projected Width | |
| | | | | Ra | Wa | % | mm | |
| Example 1 (A1) | Steel Sheet | — | Ag | 0.1 | 0.3 | 89.5 | 12 | ○ |
| Example 2 (A2) | Al | — | Ag | 0.11 | 0.89 | 89 | 18 | ○ |
| Example 3 (A3) | Al | — | Ag | 0.11 | 2.5 | 88.9 | 24 | ○ |
| Example 4 (A4) | Steel Sheet | Acrylic Resin | Ag | 0.21 | 1.1 | 88.5 | 18 | ○ |
| Example 5 (A5) | Steel Sheet | — | Ag | 0.22 | 1 | 88.1 | 16 | ○ |
| Example 6 (A6) | Steel Sheet | — | Ag | 0.29 | 0.33 | 88.2 | 14 | ○ |
| Example 7 (A7) | Steel Sheet | — | Ag | 0.3 | 2.5 | 88 | 26 | ○ |
| Comparative Example 1 (B1) | Steel Sheet | — | Ag | 0.05 | 0.15 | 89.6 | 8 | × |
| Comparative Example 2 (B2) | Steel Sheet | — | Ag | 0.2 | 3.2 | 85.6 | 38 | × |
| Comparative Example 3 (B3) | Steel Sheet | — | Ag | 0.49 | 0.3 | 86.1 | 28 | × |
| Comparative Example 4 (B4) | Steel Sheet | — | Ag | 0.6 | 1.1 | 85 | 35 | × |

LIGHT REFLECTING PLATE AND METHOD OF MANUFACTURING THE SAME, AND LIGHT REFLECTING DEVICE

CROSS-REFERENCE TO RELATED APPLICATIONS

This application is a continuation of prior International Patent Application No. PCT/JP2008/60516, filed Jun. 9, 2008, the entire contents of which are incorporated herein by reference.

BACKGROUND OF THE INVENTION

1. Field of the Invention

The present invention relates to a light reflecting plate, a method of manufacturing the same, and a light reflecting device using the light reflecting plate, more particularly to a light reflecting plate with excellent light reflection characteristics, a method of manufacturing the same, and a light reflecting device such as a mirror duct that illuminates the interior of a room by guiding sunlight indoors by the light reflecting plate.

2. Description of the Related Art

Conventionally, as a light reflecting device equipped with a light reflecting plate, a mirror duct that guides sunlight indoors to use it as illumination is known (Japanese Patent Laid-open No. Sho58-93101, Japanese Patent Laid-open No. 2000-149627). It takes in sunlight from a daylighting section, transmits the light that was taken in by reflection through a light ray guiding tube, and emits light indoors from a light emitting section.

Further, in the mirror duct described in Japanese Patent Laid-open No. 2000-149627, a light-diffusing device of a special shape is installed on a light path inside the light guiding section. The light-diffusing device diffuses and reflects light that was made incident into the mirror duct to make light ray in the mirror duct evenly spread. Note that the document also discloses an example where diffusing film is inserted halfway the light path.

However, in the mirror duct disclosed in Japanese Patent Laid-open No. Sho58-93101, spread of light ray flux of sunlight to be taken in is substantially limited to the size of a daylighting section 1 as illustrated in FIG. 9, and the light ray flux is reflected and transmitted by the mirror-finished inner wall of a light ray guiding tube 2 while maintaining the spread when the light was taken in, so that light reflected and transmitted through the light ray guiding tube 2 is outputted from the light emitting section intensively to one or a plurality of areas, and there is a problem that uneven illumination occurs.

Now, there is a problem that glare increases as the inner wall of the light ray guiding tube 2 is mirror-finished in order to increase light reflectance by regular reflection.

The method disclosed in Japanese Patent Laid-open No. 2000-149627 where the diffusing film is provided for the mirror duct has a problem that light intensity generally attenuates by several tens percent when light passes through the diffusing film although uneven illumination and glaring phenomenon are relaxed.

Further, a method in which a diffusing device of light is specially provided has a problem of taking much installing cost.

SUMMARY OF THE INVENTION

The present invention has an object to provide a light reflecting plate capable of reducing glare of reflected light while maintaining high light reflectance by regular reflection, a method of manufacturing the same, and a light reflecting device capable of preventing uneven illumination without providing a special light-diffusing device or the like.

The first invention relates to a light reflecting plate, and is characterized by including: a base; and a light reflecting layer that is formed on said base and made up of silver or silver alloy, or aluminum or aluminum alloy, in which on the surface of said light reflecting layer, arithmetic average roughness (Ra) is at a range of 0.10 to 0.30 μm and arithmetic average waviness (Wa) is at a range of 0.30 to 2.50 μm.

Note that the light reflecting plate includes both a material before working and one worked in specific dimensions.

The second invention relates to the light reflecting plate of the first invention, and is characterized in that said base is any one of a substrate that is formed by applying galvanization or zinc alloy plating to steel sheet containing iron as a main component and chromium by less than 11%, a stainless steel substrate, a substrate made up of aluminum or aluminum alloy, a glass substrate and a plastic substrate, the third invention relates to the light reflecting plate of the second invention, and is characterized in that said base includes a binder layer formed on the substrate, the fourth invention relates to the light reflecting plate of the third invention, and is characterized in that said binder layer is a film of an organic resin material, an inorganic material, or mixture of the materials, the fifth invention relates to the light reflecting plate of the first invention, and is characterized in that the surface of said light reflecting layer is coated by a protective film, the sixth invention relates to the light reflecting plate of the fifth invention, and is characterized in that said protective film is a film of an organic resin material, an inorganic material, or mixture of the materials, and the seventh invention relates to the light reflecting plate of the fifth invention, and is characterized in that said protective film is constituted of two layers of an organic resin material film and an inorganic material film.

The eighth invention relates to the method of manufacturing a light reflecting plate, and is characterized by including the steps of: preparing a base having surface texture with arithmetic average roughness (Ra) of 0.10 to 0.30 μm and arithmetic average waviness (Wa) of 0.30 to 2.50 μm; and forming a light reflecting layer made up of a film of silver, silver alloy, aluminum or aluminum alloy on said base by any one of an electrolytic plating method, an electroless plating method and an evaporation method, the ninth invention relates to the method of manufacturing a light reflecting plate of the eighth invention, and is characterized by including a step of forming a protective film on the light reflecting layer after the step of forming said light reflecting layer, the tenth invention relates to the method of manufacturing a light reflecting plate of the eighth invention, and is characterized in that said base is constituted of any one of a steel sheet substrate, an aluminum substrate, a glass substrate and a plastic substrate, said arithmetic average roughness (Ra) and arithmetic average waviness (Wa) are imparted on the surface of the substrate in forming the substrate, the eleventh invention relates to the method of manufacturing a light reflecting plate of the eighth invention, and is characterized in that said base is one that a binder layer is formed on the substrate by a coating method, said arithmetic average roughness (Ra) and arithmetic average waviness (Wa) are imparted on the surface of said binder layer by adjusting a viscosity of coating liquid and a thickness of a coating film in forming the binder layer, the twelfth invention relates to a light reflecting device, and is characterized by including said light reflecting plate described in the first invention, the thirteenth invention relates to the light reflecting device of the twelfth invention, and is characterized in that said light reflecting device is a mirror duct including a daylighting section, a light guiding section and a light emitting section, and said light reflecting plate is provided on the inner wall of said light guiding section, the fourteenth invention relates to the light reflecting device, and is characterized by including said light reflecting plate manufactured by the method of manufacturing a light reflecting plate of the eighth invention, and the fifteenth invention relates to the light reflecting device of the fourteenth invention, and is characterized in that said light reflecting device is a mirror duct including a daylighting section, a light guiding section and a light emitting section, and said light reflecting plate is provided on the inner wall of said light guiding section.

As described above, according to the light reflecting plate of the present invention, because it is equipped with the light reflecting layer made up of the film of silver or silver alloy, or the film of aluminum or aluminum alloy, it has excellent reflection efficiency particularly over the entire visible light region.

Since arithmetic average roughness (Ra) on the surface of the light reflecting layer is as small as 0.10 to 0.30 μm, high light reflectance by regular reflection can be maintained. In addition, since arithmetic average waviness (Wa) is imparted on the surface of the same light reflecting layer and the range of arithmetic average waviness (Wa) is set to 0.3 to 2.5 μm, diffuse reflection of light can be generated without reducing light reflectance by regular reflection.

Thus, glare of reflected light can be reduced while maintaining high light reflectance by regular reflection.

According to the method of manufacturing a light reflecting plate of the present invention, a light reflecting layer made of a silver film or the like is formed on a base having the surface texture with the arithmetic average roughness (Ra) of 0.10 to 0.30 μm and the arithmetic average waviness (Wa) of 0.30 to 2.50 μm by electroless plating method or the like. Therefore, the surface texture on the base is taken over to the light reflecting layer and desired surface texture can be easily imparted on the light reflecting layer.

According to the light reflecting device of the present invention, glare of reflected light can be reduced while maintaining high intensity of reflected light because the device is equipped with the above-described light reflecting plate.

Particularly, sunlight or the like can be transmitted by diffuse reflection by applying the above-described light reflecting plate to the light guiding section inner wall of a mirror duct, and uneven indoor illumination can be prevented. Further, because it is not necessary to specially provide the diffusing device or the diffusing film of light, cost can be reduced and attenuation of light intensity can be prevented.

BRIEF DESCRIPTION OF THE DRAWINGS

FIG. 3 relates to the light reflecting plate being the first embodiment of the present invention, and is a table describing comparison/evaluation result regarding the light reflection characteristics.

FIG. 6C is surface texture of the light reflecting plate being the first embodiment of the present invention.

PREFERRED EMBODIMENTS OF THE INVENTION

Figure 1A:
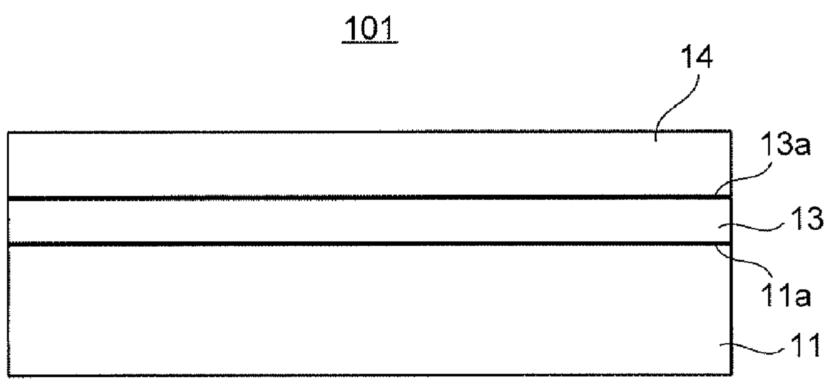
FIGS. 1A and 1B are side surface views illustrating two types of structures of a light reflecting plate being the first embodiment of the present invention.

In the following, description will be made for the embodiments of the present invention referring to the drawings based on the following items.

(Description Items)

(1) Description of progress of the present invention (2) Description of light reflecting plate according to the first embodiment (i) Structure of light reflecting plate (a) Structure of substrate (b) Structure of light reflecting layer (c) Structure of protective film (ii) Another structure of light reflecting plate (iii) Surface texture of light reflecting layer of light reflecting plate and its imparting method (iv) Method of manufacturing light reflecting plate (v) Evaluation of surface texture (3) Description of light reflecting device according to the second embodiment of the present invention (i) Mirror duct

DESCRIPTION OF EMBODIMENTS

(1) Description of Progress of the Present Invention

Figure 6A:
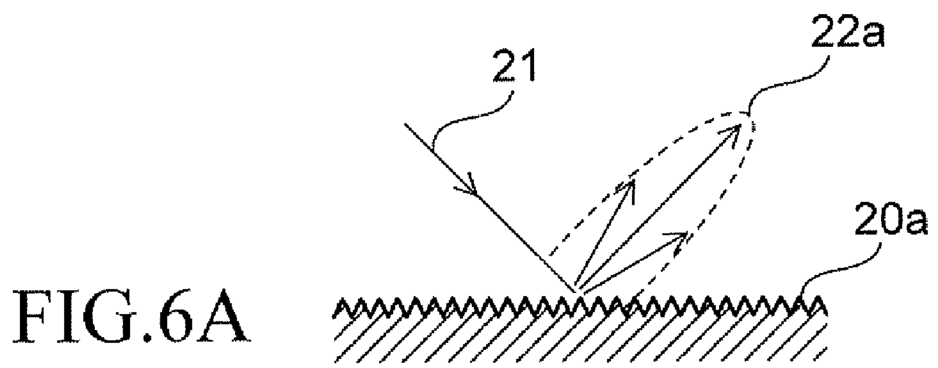
FIGS. 6A, 6B, and 6C is schematic views describing the relationship between surface texture of reflecting surface and light reflection regarding the light reflecting plate.
Figure 6B:
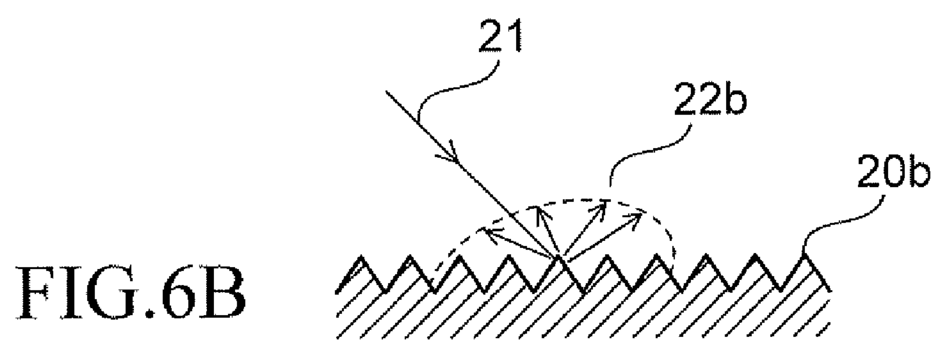
Figure 6C:
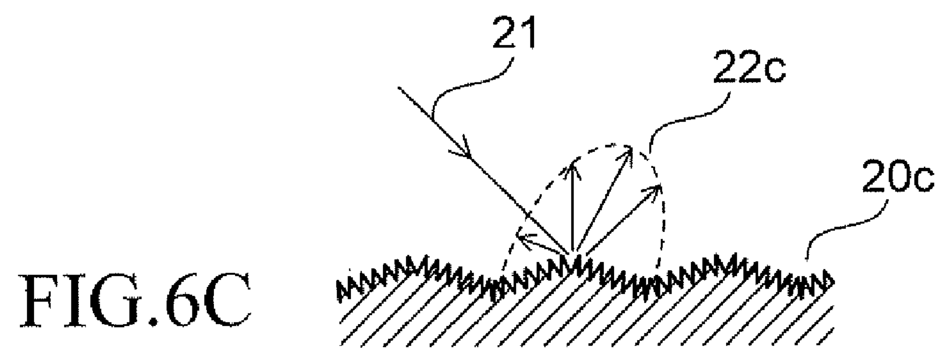

FIGS. 6A, 6B, and 6C are schematic views explaining the relationship between the surface texture of reflecting surface and the reflection characteristics of light.

FIG. 6A illustrates the reflection characteristics of light in the case where reflecting surface 20*a* does not have waviness and the arithmetic average roughness (Ra) is small. Reference numeral 21 indicates incident light, and 22*a* indicates reflected light. In this case, since regular reflection becomes strong on the reflecting surface 20*a* (regular reflectance becomes higher), the reflected light 22*a* is felt glaring. On the other hand, as illustrated in FIG. 6B, since diffuse reflection becomes stronger on reflecting surface 20*b* (diffuse reflectance becomes higher) when the arithmetic average roughness (Ra) of the reflecting surface 20*b* becomes larger, glare of the reflected light 22*b* improves but light quantity reaching the light receiving surface becomes smaller.

The present inventors conducted various kinds of study and examination as to how the glare should be improved while the intensity of reflected light is maintained.

As a result, as illustrated in FIG. 6C, the inventors found out that diffuse reflection occurred on reflecting surface 20*c* together with regular reflection when the arithmetic average waviness (Wa) provided in JISB0601 was added even if the arithmetic average roughness (Ra) was equal to FIG. 6A on the reflecting surface 20*c*. Then, the inventors found out that by appropriately adjusting the levels of the arithmetic average roughness (Ra) and the arithmetic average waviness (Wa), diffuse reflectance could be increased while maintaining high regular reflectance so as to maintain high intensity of reflected light and reduce glare.

Then, in the case where the surface texture illustrated in FIG. 6C is applied to a mirror duct inner wall, glare of illumination light could be reduced while high reflection and transmission efficiency of light were maintained. Moreover, since light ray flux spreads in a wider range by diffuse reflection in reflecting and transmitting light, it was possible to prevent uneven illumination in light emitting section.

(2) Description of the Light Reflecting Plate According to the First Embodiment (i) Structure of the Light Reflecting Plate FIG. 1A is a cross-sectional view of the structure of a light reflecting plate 101 according to the first embodiment.

The light reflecting plate 101 is formed of a substrate (base) 11 and a light reflecting layer 13 on the substrate 11 as illustrated in FIG. 1A. Note that a protective film 14 may be formed on the light reflecting layer 13 if needed.

The surface 11*a* of the substrate 11 has roughness or waviness as depicted in FIG. 6C. Roughness is defined as the arithmetic average roughness (Ra) by JISB0601, and is set to the range of 0.10 to 0.30 μm in this embodiment. Waviness is also defined as the arithmetic average waviness (Wa) by the standard, and is set to the range of 0.30 to 2.50 μm in this embodiment. The surface texture is taken over to the light reflecting layer 13, and the surface 13*a* of the light reflecting layer 13 also has substantially the same surface texture as the substrate 11.

(a) Structure of the Substrate

The substrate 11, to be used, that forms of the light reflecting plate 101 is a plate or foil made of metal (hereinafter, generically called a metal plate unless particularly described), a plate or foil made of surface treated metal (hereinafter, generically called a surface-treated metal plate unless particularly described), a glass plate, or a plate or film made of plastic (hereinafter, generically called a plastic plate unless particularly described).

A steel sheet or an aluminum plate is used for the metal plate. The steel sheet includes a plate of iron alloy having less than 11% by mass of chromium content or iron alloy having 11% by mass or more of chromium content, which is a so-called stainless steel plate. Particularly, since iron alloy steel sheet having less than 11% by mass of chromium content is an inexpensive material comparing with aluminum or stainless steel, it is preferable for widely promoting products. The aluminum plate is a general term for a pure aluminum plate and an aluminum alloy plate in this embodiment. The aluminum alloy has aluminum as a main component, and magnesium (Mg), manganese (Mn), silicon (Si) or the like added in order to impart strength, workability, corrosion resistance or the like.

The surface-treated metal plate is what various types of plating is applied on a surface of the above-described metal plate, or what alumite treatment is applied on a surface of an aluminum plate. Note that a layer (surface-treated layer) formed by surface treatment on the metal plate surface is provided not for reflecting light but for rustproofing or the like.

As metal used in plating, zinc, zinc alloy, tin, nickel, chromium or the like can be used.

Next, out of the surface-treated metal plates, description will be made in detail particularly for steel sheet to which galvanization or zinc alloy plating is applied (hereinafter, referred to as galvanized steel sheet).

The galvanized steel sheet has several types due to plating methods. For example, they are hot-dip galvanized steel sheet, hot-dip zinc alloy plated steel sheet, electrolytic galvanized steel sheet, electrolytic zinc alloy plated steel sheet and the like.

Zinc or zinc alloy is used as a metal used in plating. The applicable zinc alloy is one which contains zinc (Zn) and aluminum (Al) of 5 or 55% by mass, one which contains zinc (Zn), cobalt (Co) and molybdenum (Mo), or the like.

Although the galvanized steel sheet may be used directly as a substrate, chemical treatment may be further applied to prevent peel or alteration of plating of zinc or the like. The applicable chemical treatment is chromate treatment, phosphate treatment, lithium-silicate treatment, silane coupling treatment, zirconium treatment or the like, for example.

To the surface 11*a* of the substrate 11, the arithmetic average roughness (Ra) in the range of 0.10 to 0.30 μm and the arithmetic average waviness (Wa) in the range of 0.30 to 2.50 μm can be applied by a method described later in item (iii).

(b) Structure of the Light Reflecting Layer

A film of silver or silver alloy, or a film of aluminum or aluminum alloy can be used for the light reflecting layer 13.

Among them, the film of silver or silver alloy can be formed by an electroless plating method such as a spray plating method in which silver is reduced and deposited by silver mirror reaction, for example. Applicable method other than this method is an electroplating method using electrolysis in aqueous solution containing silver ion, an evaporation method in which silver is evaporated under reduced-pressure atmosphere to form a film, or the like. It is preferable that the thickness of silver film or the like be approximately 0.01 to 0.3 μm at which practical reflection effect can be obtained.

Further, an evaporation method or a dry plating method such as an ion plating method can be used for forming aluminum film or the like. Particularly, film formed by the evaporation method is preferable because high regular reflectance can be secured. A most suitable film thickness of aluminum film or the like is approximately 0.01 to 0.2 μm at which a so-called glossy surface can be obtained.

In both silver film or the like and aluminum film or the like, pinholes inevitably occur to reduce reflectance if the film thickness is too thin. On the other hand, tendency of sharp drop of so-called reflectance is observed if film thickness is too thick.

The light reflecting layer 13 substantially directly takes over the surface texture of the substrate 11 in the above-described film thickness range, and has substantially the same surface texture as the substrate 11.

(c) Structure of the Protective Film

Silver film or the like being the light reflecting layer 13 easily discolors or cause contamination or the like when it is exposed to the atmosphere. Particularly, it easily discolors when the atmosphere contains only a trace amount of gas containing sulfur. Moreover, in the case of cleaning dirt and dust attached to the silver film, the silver film easily leaves discoloration trace by detergent. The protective film 14 is provided on the light reflecting layer 13 to prevent them. This makes it possible to maintain performance as a light reflecting plate and conduct the maintenance/management for a long period of time.

The protective film 14 for use is a film made of an organic resin material, an inorganic material, or mixture of the materials. Alternatively, the film may be formed of two layers of an organic resin material film and an inorganic material film.

The organic resin material for use is transparent and thin polyester resin, acrylic resin, silicon resin or the like, and the inorganic material for use is titanium oxide with excellent contamination resistance or the like. The film of an organic resin material or the like is formed by a coating method using coating liquid in which a material is dissolved or an adhered material in a film state.

Note that an enhanced reflection film may be used as the protective film 14. The enhanced reflection film includes lamination of two layers of a layer made of a material having large refractive index such as titanium oxide, for example, and a layer made of a material having small refractive index such as silicon oxide for example, in which the entire optical thickness (physical film thickness×refractive index) is set to $\lambda/2$ ($\lambda$: wavelength of light) by setting the optical thickness of each layer to $\lambda/4$. It is possible to further improve regular reflectance of light by using the enhanced reflection film.

(ii) Another Structure of Light Reflecting Plate

Figure 1B:
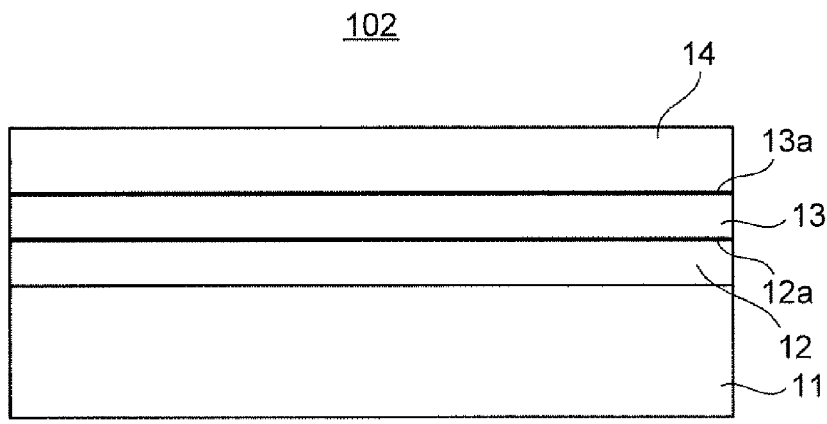

Next, description will be made for another structure of the light reflecting plate according to the first embodiment. FIG. 1B is a cross-sectional view illustrating the structure of the plate.

In the structure of a light reflecting plate 102 of FIG. 1B, what is different from FIG. 1A is that a binder layer 12 is interposed between the substrate 11 and the light reflecting layer 13. In this case, the substrate 11 and the binder layer 12 form of a base.

The binder layer 12 is provided in order to improve corrosion resistance of the substrate 11 itself, and furthermore, to improve adhesion between the substrate 11 and the light reflecting layer 13 by interposing between the substrate 11 and the light reflecting layer 13. Particularly, in the case where galvanized or zinc alloy plated steel sheet is used as the substrate 11, it is desirable to form the binder layer 12 on the steel sheet in order to make adhesion with the light reflecting layer 13 robust. By applying corona discharge treatment or glow discharge treatment to the surface of the binder layer 12, adhesion with silver film stacked thereon further improves.

In this structure, in order to impart the surface texture with the arithmetic average roughness (Ra) of 0.10 to 0.30 μm and the arithmetic average waviness (We) of 0.30 to 2.50 μm on the surface 13*a* of the light reflecting layer 13, surface texture same as this one is previously imparted on the surface 12*a* of the binder layer 12 being the backing.

The applicable binder layer 12 is a painted film or a film in film state, which is made of various materials. Types of materials of the painted film are not particularly limited as long as they are organic resin materials having good adhesion to the substrate 11, but a particularly preferable one is paint of polyester resin, alkyd resin, acrylic resin, two-part curable polyurethane resin or the like. The applicable material of a film in film state is polyethylene, polycarbonate resin, polyamide resin, polyimide resin or the like. In the case where the binder layer 12 is the painted film, it can be fabricated on the substrate 11 by a coating method using paint in which materials are dissolved. In the case where the binder layer 12 is the film in film state, it can be fabricated on the substrate 11 by adhering the film on the substrate 11 by adhesive agent or the like. It is necessary that the binder layer 12 be formed in a film thickness at which desired surface texture can be imparted.

Note that the surface texture of the binder layer 12 affects the surface texture of the light reflecting layer 13 and further affects the reflection characteristics of the light reflecting plate, so that a fabricating method of the layer is important. More detail fabricating method of the binder layer 12 to impart predetermined surface texture to the binder layer 12 will be described later.

(iii) Surface Texture of the Light Reflecting Layer of the Light Reflecting Plate and its Imparting Method Next, description will be made for the surface texture of the light reflecting layer, which greatly affects the reflection characteristics of the light reflecting plate, and an imparting method thereof.

The reflection characteristics of the light reflecting plate is directly determined by the surface texture of the light reflecting layer 13. Then, in the light reflecting plate 101, because the surface texture of the light reflecting layer 13 takes over the surface texture of the substrate 11, the surface texture of the substrate 11 (surface of surface-treated layer in the case of surface-treated metal plate) needs to be previously adjusted. In the light reflecting plate 102, the surface texture of the light reflecting layer 13 takes over the surface texture of the surface 12*a* of the binder layer 12, so that the surface texture of the binder layer 12 needs to be previously adjusted.

Figure 2A:
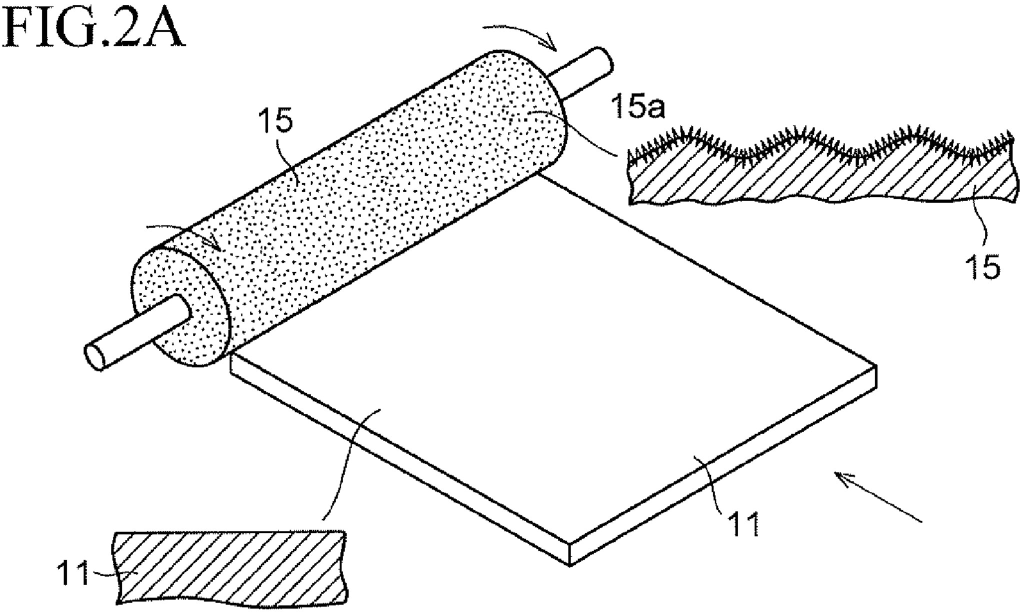
FIGS. 2A and 2B relate to the method of manufacturing the light reflecting plate being the first embodiment of the present invention, and are perspective views illustrating a method of imparting surface texture on a substrate.

In the light reflecting plate 101, when the substrate 11 is a surface-treated metal plate, a mill roll 15 having waviness being predetermined surface texture or finer unevenness is allowed to come into contact with the surface 11*a* of the substrate (rolled body) 11 to perform finishing rolling (also called temper rolling) in order to impart desired surface texture, as depicted in FIG. 2A. Thus, the surface texture on the surface of the mill roll 15 is transferred onto the surface of the substrate 11 to impart the surface texture on the surface of the substrate 11.

To previously impart predetermined surface texture on the surface 15*a* of the mill roll 15 that is used in temper rolling, polishing processing by abrasive, shot dull processing, discharge dull processing or the like is used. Alternatively, laser dull processing, electron beam processing or the like may be used.

In the temper rolling, desired surface texture can be easily obtained by adjusting rolling conditions such as rolling load of the mill roll against a rolled body, tensile force added to the rolled body, or the like.

In the temper rolling, using two pairs of finishing mill rolls having different surface textures from each other, mirror finish rolling may be performed to make the surface flat on a former stage, and then be followed by shot dull finish rolling to impart surface texture on a latter stage. By the combination of the mirror finishing rolls having different surface textures from each other and the shot dull rolls, the surface texture of a rolled body can be controlled with good accuracy.

However, in cold-rolled steel sheet to which relatively thick galvanization such as hot-dip galvanization is applied, surface texture changes due to plating when surface texture is imparted before plating, so it is desirable to perform temper rolling after plating.

In the case where the substrate (rolled body) 11 is a glass plate, surface texture is imparted on the substrate 11 by performing physical grinding, polishing or chemical etching (erosion) by acid solution. For example, a flat glass plate is mounted on a flat and level table, the glass plate is allowed to pass under a grinding head, and appropriate polishing agent is supplied to the grinding head. Aqueous suspension liquid of sand is used as a preferable polishing agent. Normally, as grinding progresses, grains of polishing agent to be used are made smaller gradually by the stage to adjust surface texture. In the case where the substrate (rolled body) 11 is a plastic plate (including film), a heating metal roll, which is finished in predetermined surface texture, is pressed against the plate to transfer the surface texture in the state where temperature is increased to a glass transition point or higher, and to thus impart surface texture on the substrate 11.

On the other hand, in the light reflecting plate 102, texture of the surface 12*a* of the binder layer 12 can be easily adjusted into a desired range by combining adjustment of paint viscosity with adjustment of the thickness of film to be formed. For example, when dilution of paint is increased to reduce viscosity, the arithmetic average roughness (Ra) can be made smaller. On the other hand, by reducing dilution of paint to make viscosity higher and appropriately adjusting an amount of paint related to the thickness of film to be formed, the arithmetic average waviness (Wa) can be made larger. Therefore, desired surface texture is obtained by appropriately performing adjustment of paint viscosity and adjustment of paint amount.

Giving a specific example, in the case where two-part curable polyurethane resin is used as a material of the binder layer 12, base resin, hardener, solvent and leveling agent are blended into the ratio of 5:1:20:2, paint viscosity is set to 9 to 10 seconds (a viscosity cup NK-2 manufactured by Anest Iwata Corporation), the binder layer 12 is formed by a spray gun to bring thickness after drying to 3 to 8 μm, and thus the arithmetic average roughness (Ra) and the arithmetic average waviness (Wa) can be adjusted to a desired range.

(iv) Method of Manufacturing the Light Reflecting Plate

Next, referring to FIG. 1 and FIG. 2, description will be made for the manufacturing method of the light reflecting plate 101. Particularly, FIGS. 2A and 2B are perspective views showing methods of imparting surface texture to the substrate 11.

First, cold-rolled steel sheet (substrate) 11 is prepared. It is fabricated by performing acid pickling, cold rolling and annealing which is based on a regular process of manufacturing cold-rolled steel sheet.

Figure 2B:
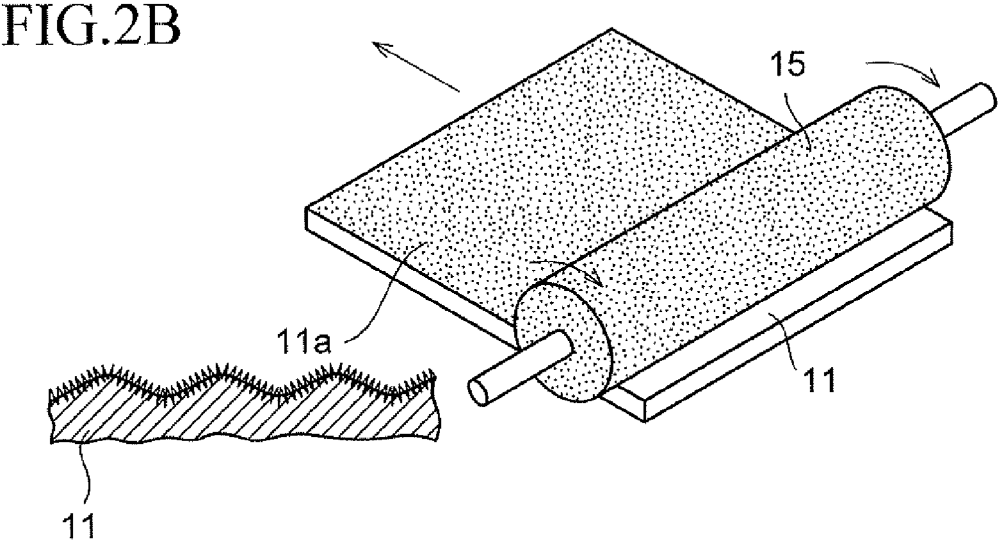

Next, to impart desired surface texture to the cold-rolled steel sheet 11, temper rolling is performed by a rolling mill as illustrated in FIGS. 2A and 2B. Note that temper rolling by two pairs of mill rolls was described in the item (iii), but temper rolling by a pair of mill rolls is executed in the description of this manufacturing method. Although only one mill roll is illustrated in FIGS. 2A and 2B, actually, a pair of mill rolls are installed in a opposing manner.

In the temper rolling, rolling is performed by sandwiching and moving the prepared cold-rolled steel sheet 11 between mill rolls, which is polished into predetermined surface finish, to impart surface texture to the cold-rolled steel sheet 11. In this case, rolling conditions (rolling load, tensile force) are appropriately adjusted. By the temper rolling, the arithmetic average roughness (Ra) of 0.10 to 0.30 μm and the arithmetic average waviness (Wa) of 0.30 to 2.50 μm are imparted on the surface 11*a* of the cold-rolled steel sheet 11 as illustrated in FIG. 2B.

The surface texture imparting method in the cold-rolled steel sheet 11 to which plating was not applied has been described above. In addition, plating of zinc or the like can be also applied for imparting corrosion resistance after applying the above-described temper rolling. An applicable method of applying galvanization or zinc alloy plating is, for example, any one of hot-dip galvanizing, hot-dip zinc alloy plating, electrolytic galvanizing and electrolytic zinc alloy plating.

The hot-dip galvanizing method or the hot-dip zinc alloy plating method is a method in which steel sheet is immersed into hot-dipped zinc or into hot-dipped zinc alloy to clad zinc or zinc alloy. Further, the electrolytic galvanizing method or the electrolytic zinc alloy plating method is a method of coating with zinc or zinc alloy by immersing steel sheet into plating liquid in which zinc or the like is dissolved, or into plating liquid in which zinc alloy or the like is dissolved, and applying a voltage between the steel sheet and a zinc anode.

In the case of steel sheet to which relatively thick plating is applied by hot-dip galvanization or the like, surface roughness or the like changes due to plating if surface texture is imparted before plating. Hence, it is preferable to perform temper rolling after plating.

Next, for degreasing the substrate 11 surface, the surface of the substrate 11 is cleaned by alkaline solution. Subsequently, the above-described substrate 11 is rinsed by using ion-exchanged water or distilled water and dried. Note that cleaning by alkaline solution does not need to perform depending on the surface condition of the binder layer 12.

Next, a pre-processing for forming silver film is performed. The pre-processing is a processing of forming tin on the substrate 11, and silver mirror reaction is executed after that.

In the pre-processing, aqueous solution (pre-processing activator) that contains stannic chloride containing hydrochloric acid, stannous chloride and ferric chloride is coated on the surface of the substrate 11 first, and tin as a catalyst is formed on the surface of the substrate 11. It is preferable that the pre-processing solution be adjusted to pH 2 or less.

Next, the surface of the substrate 11, on which tin was deposited, is cleaned by using ion-exchanged water or distilled water to remove residual pre-processing solution on the surface of the substrate 11.

Performing the pre-processing in this manner is followed by carrying out a process of forming a silver film being the light reflecting layer 13 on the substrate 11 by silver mirror reaction.

In the silver film forming process, the ammoniacal silver nitrate aqueous solution of pH 10 to 13 and aqueous solution of pH 8 to 12 containing reducer (such as hydrazine sulfate and glyoxal, for example) are simultaneously discharged on the surface of the pre-processed substrate 11. The reducer aqueous solution to be used is one that reducer is dissolved in water or diluted by water and sodium hydroxide is added thereto into alkaline. Thus, silver deposits on the surface of the substrate 11 based on the starting nucleus of silver to form silver film.

The formed silver film takes over the surface texture of the substrate 11, and the surface texture with the arithmetic average roughness (Ra) of 0.10 to 0.30 μm and the arithmetic average waviness (Wa) of 0.30 to 2.50 μm is imparted to the surface 13*a*.

Next, the substrate 11 is cleaned by using ion-exchanged water or distilled water to remove residual ammoniacal silver nitrate aqueous solution and reducer aqueous solution on the surface of the light reflecting layer 13.

Subsequently, water droplets attached to the surface of the light reflecting layer 13 are blown out by airblow. After that, a drying process for drying the substrate 11 is performed. Drying conditions are set to the temperature of 70° C. for 20 minutes, for example.

If needed, the protective film 14 is formed on the light reflecting layer 13. Describing it in details, the protective film 14 is formed by a coating method using coating liquid in which an inorganic material or an organic resin material is dissolved, or by adhering the organic resin material in a film state.

This completes the light reflecting plate 101 illustrated in FIG. 1A.

As described above, according to the method of manufacturing a light reflecting plate of this embodiment, light reflecting layer 13 made of silver film or the like is formed on the substrate 11 having the surface texture with the arithmetic average roughness (Ra) of 0.10 to 0.30 μm and the arithmetic average waviness (Wa) of 0.30 to 2.50 μm by the electroless plating method or the like. Since the surface texture of the surface of the substrate 11 is taken over to the light reflecting layer 13, desired surface texture can be easily imparted on the light reflecting layer 13.

Now, in the manufacturing method of a light reflecting plate, silver film being the light reflecting layer 13 is formed directly on the substrate 11, but the binder layer 12 having the surface texture of this invention may be formed on the substrate 11 before forming the light reflecting layer 13 as illustrated in FIG. 1B. In this case, the surface texture of this invention may not be imparted on the substrate 11.

To form the binder layer 12 having the surface texture of this invention on the substrate 11, paint is coated on the substrate 11. The paint is made of any one of polyester resin, alkyd resin, acrylic resin and two-part curable polyurethane resin and is appropriately adjusted in the viscosity. At this moment, a coating amount is adjusted to make it possible to obtain a predetermined film thickness. After coating it in this manner, the paint is dried to form on the surface 12*a* the binder layer 12 having the surface texture with the arithmetic average roughness (Ra) of 0.10 to 0.30 μm and the arithmetic average waviness (Wa) of 0.30 to 2.50 μm.

Further, though the electroless plating method by a spraying method is used as a forming method of the silver film, an immersion method can be used. Other than this, an electroplating method or an evaporation method may be used.

Further, aluminum film may be used instead of the silver film. In the case of forming aluminum film by the evaporation method, for example, the degree of vacuum is set to about $1\times10^{-3}$ Pa and substrate heating is carried out at about 300K.

(v) Characteristics Evaluation of Surface Texture

Next, light reflecting plates having various surface textures were fabricated, and specific examples whose characteristics were evaluated will be described below.

(Fabrication Conditions of the Light Reflecting Plate)

Based on the above-described method of manufacturing a light reflecting plate, light reflecting plates were fabricated as samples used for characteristics evaluation. The protective film 14 is omitted in this case. The samples are described all together on the table of FIG. 3.

Example 1 (A1)

On cold-rolled steel sheet (the substrate 11, the same applies below) to which surface texture with the arithmetic average roughness (Ra) of 0.1 μm and the arithmetic average waviness (Wa) of 0.3 μm was imparted, silver (Ag) film (the light reflecting layer 13, the same applies below) having the thickness of 100 nm was formed by electroless plating method using ammoniacal silver nitrate aqueous solution of approximately pH 10 and reducer (hydrazine sulfate) aqueous solution of approximately pH 10.

Note that the arithmetic average roughness (Ra) and the arithmetic average waviness (Wa) were measured based on items of (Characteristics Evaluation) below. The same applies below. Note that the cold-rolled steel sheet of the substrate 11 was simply described as steel sheet on the table of FIG. 3. The same applies below.

Example 2 (A2)

On an aluminum (Al) plate (the substrate 11, the same applies below) to which surface texture with the arithmetic average roughness (Ra) of 0.11 μm and the arithmetic average waviness (Wa) of 0.89 μm was imparted, silver (Ag) film having the thickness of 100 nm was formed by the electroless plating method same as Example 1.

Example 3 (A3)

On an aluminum (Al) plate to which surface texture with the arithmetic average roughness (Ra) of 0.11 μm and the arithmetic average waviness (Wa) of 2.5 μm was imparted, silver (Ag) film having the thickness of 100 nm was formed by the electroless plating method same as Example 1.

Example 4 (A4)

On cold-rolled steel sheet to which surface texture with the arithmetic average roughness (Ra) of 0.21 μm and the arithmetic average waviness (Wa) of 1.1 μm was imparted, silver (Ag) film having the thickness of 100 nm was formed by the electroless plating method same as Example 1.

Example 5 (A5)

On cold-rolled steel sheet (the substrate 11), acrylic resin film (the binder layer 12) to which surface texture with the arithmetic average roughness (Ra) of 0.22 μm and the arithmetic average waviness (Wa) of 1.0 μm was imparted was formed, and silver (Ag) film having the thickness of 100 nm was formed on the acrylic resin film by the electroless plating method same as Example 1.

Example 6 (A6)

On cold-rolled steel sheet to which surface texture with the arithmetic average roughness (Ra) of 0.29 μm and the arithmetic average waviness (Wa) of 0.33 μm was imparted, silver (Ag) film having the thickness of 100 nm was formed by the electroless plating method same as Example 1.

Example 7 (A7)

On cold-rolled steel sheet to which surface texture with the arithmetic average roughness (Ra) of 0.3 μm and the arithmetic average waviness (Wa) of 2.5 μm was imparted, aluminum (Al) film (the light reflecting layer 13) having the thickness of 0.05 μm was formed by an evaporation method while the degree of vacuum was set to about $1\times10^{-3}$ Pa and substrate heating was set to about 300K.

Comparative Example 1 (B1)

On cold-rolled steel sheet to which surface texture with the arithmetic average roughness (Ra) of 0.05 μm and the arithmetic average waviness (Wa) of 0.15 μm was imparted, silver (Ag) film having the thickness of 100 nm was formed by electroless plating method same as Example 1.

Comparative Example 2 (B2)

On cold-rolled steel sheet to which surface texture with the arithmetic average roughness (Ra) of 0.2 μm and the arithmetic average waviness (Wa) of 3.2 μm was imparted, silver (Ag) film having the thickness of 100 nm was formed by the electroless plating method same as Example 1.

Comparative Example 3 (B3)

On cold-rolled steel sheet to which surface texture with the arithmetic average roughness (Ra) of 0.49 μm and the arithmetic average waviness (Wa) of 0.3 μm was imparted, silver (Ag) film having the thickness of 100 nm was formed by the electroless plating method same as Example 1.

Comparative Example 4 (B4)

On cold-rolled steel sheet to which surface texture with the arithmetic average roughness (Ra) of 0.6 μm and the arithmetic average waviness (Wa) of 1.1 μm was imparted, silver (Ag) film having the thickness of 100 nm was formed by the electroless plating method same as Example 1.

(Characteristics Evaluation)

The arithmetic average roughness (Ra) and the arithmetic average waviness (We) were measured for each sample, and furthermore, regular reflectance and projected width (S) of a reflected light were measured. Measurement results are described all together on the table of FIG. 3.

(Evaluation Method and Conditions of the Arithmetic Average Roughness (Ra) and Arithmetic Average Waviness (Wa))

The arithmetic average roughness (Ra) and the arithmetic average waviness (Wa) were measured by the method provided in JISB0601 based on conditions described on Table 1.

TABLE 1

| Measurement condition item | Arithmetic average roughness (Ra) μm | Arithmetic average waviness (Wa) μm |
|---|---|---|
| Measured length (mm) | 1.25 | 8 |
| Cutoff wavelength (mm) | 0.25 | 0.8 |

(Evaluation Method and Conditions of Regular Reflectance)

Regular reflectance is an index representing light transmission performance inside a mirror duct, for example, in which the larger the regular reflectance, the higher light transmission efficiency.

The regular reflectance is obtained by subtracting actually measured diffuse reflectance from actually measured total reflectance. The total reflectance and the diffuse reflectance were measured by using a spectrocolorimeter (manufacture by Minolta, Model No. CM-3500d, wavelength: 550 nm) and based on the provision of Condition (c) of JISZ8722. Regular reflectance of 88% or more corresponding to practical light transmission efficiency was set as an acceptable value.

(Evaluation Method And Conditions Of Projected Width (S) of Reflected Light)

The projected width (S) of the reflected light is an index representing degree of glare, in which a part of regular reflection changes to diffuse reflection to reduce glare of reflected light as the projected width (S) of the reflected light is larger.

Figure 7:
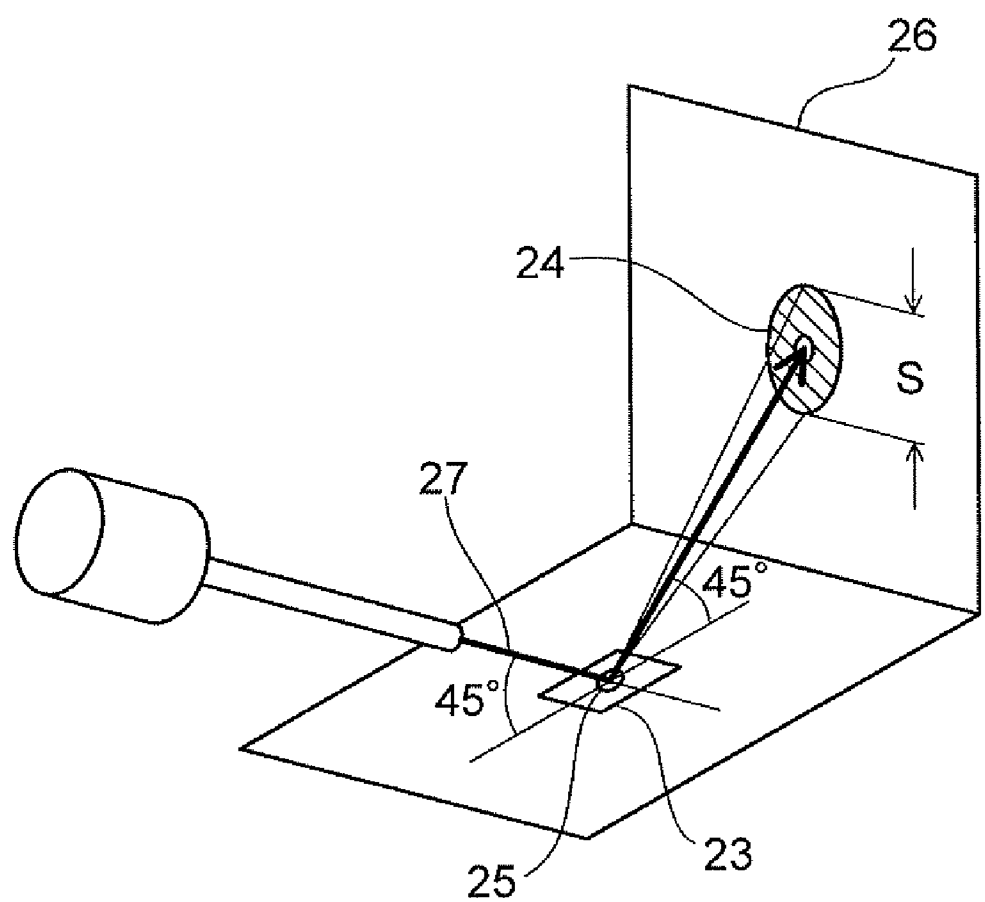
FIG. 7 relates to the light reflecting plate being the first embodiment of the present invention, and is a perspective view illustrating a measuring method of the projected width (S) of the reflected light.

The projected width (s) of the reflected light can be measured by a measuring method illustrated in FIG. 7. In the measuring method, as illustrated in the drawing, laser beam 27 (major axis of a projection circle 25 on measured sample surface is 5 mm) is irradiated to the surface of a measured sample 23 at the angle of 45°, and its reflected light ray is projected onto a projection screen 26 provided perpendicularly in a standing manner at a position 30 cm away from the projection circle 25.

As a result, a reflected and projected ellipse 24 of the laser beam is projected on the projection screen in the projected width of the reflected light (S: major axis of an ellipse) corresponding to the surface texture of the measurement sample 23. As waviness represented by the arithmetic average waviness (Wa) on measured sample surface becomes larger, the projected width of the reflected light becomes larger and its outline becomes unclear.

In this embodiment, 12 mm or more of the projected width (S) of the reflected light was treated as an acceptable value on the basis of a light reflecting plate whose reflected light is not felt glaring. In the evaluation columns on the table of FIG. 3, samples satisfying 88% or more of the regular reflectance and 12 mm or more of the projected width (S) of the reflected light were indicated by an acceptance mark ○ and samples that do not satisfy either one were indicated by a failure mark x.

(Evaluation Result)

The arithmetic average roughness (Ra) and the arithmetic average waviness (We) were evaluated (Evaluation 1) by regular reflectance, and the arithmetic average roughness (Ra) and the arithmetic average waviness (Wa) were evaluated (Evaluation 2) by the projected width (S) of the reflected light.

(Evaluation 1)

Figure 4:
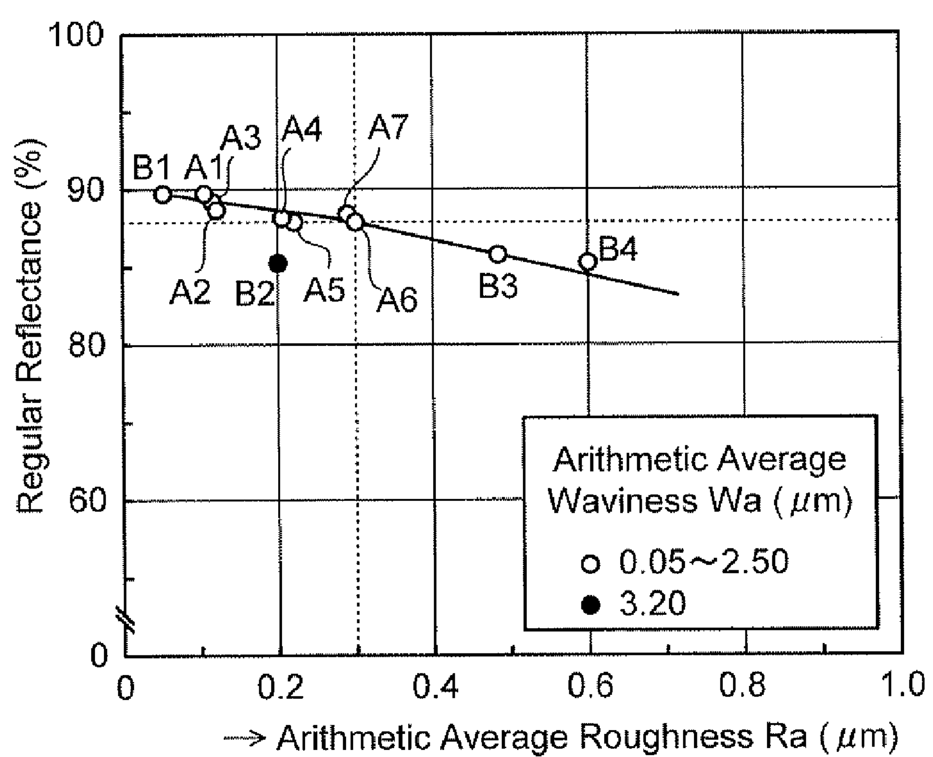
FIG. 4 relates to the light reflecting plate being the first embodiment of the present invention, and is a graph depicting the relationship between the arithmetic average roughness (Ra) and the regular reflectance of reflecting surface in each sample on the table of FIG. 3.

FIG. 4 is a graph depicting a relationship between the arithmetic average roughness (Ra) and the regular reflectance, which was prepared by using the measurement results of the table of FIG. 3. Figures written in the graph indicates sample numbers. The graph indicates each sample while being capable of collating the range of the arithmetic average waviness (Wa). White circles (○) indicate samples in the range of 0.05 to 2.5 μm of the arithmetic average waviness (Wa), and a black circle (●) indicates a sample in the range of 3.2 μm of the arithmetic average waviness (Wa).

In FIG. 4, regarding the samples having the arithmetic average waviness (Wa) of 0.05 to 2.5 μm, the regular reflectance has generally constant relationship with the arithmetic average roughness (Ra). Specifically, although sufficiently large value as 88% of the regular reflectance is secured at 0.3 μm or less of the arithmetic average roughness (Ra), reduction of the regular reflectance becomes larger when the arithmetic average roughness (Ra) exceeds 0.3 μm. Therefore, to secure sufficiently large light transmission efficiency by reflection, it is preferable that the upper limit of the arithmetic average roughness (Ra) on the film surface of the light reflecting layer 13 is set to 0.3 μm.

On the other hand, the sample having the arithmetic average waviness (Wa) of 3.20 μm (Comparative Example 2 (● mark)) has low regular reflectance of 85.6% regardless of the arithmetic average roughness (Ra) of 0.3 μm or less, and light transmission efficiency by reflection is not good.

(Evaluation 2)

Figure 5:
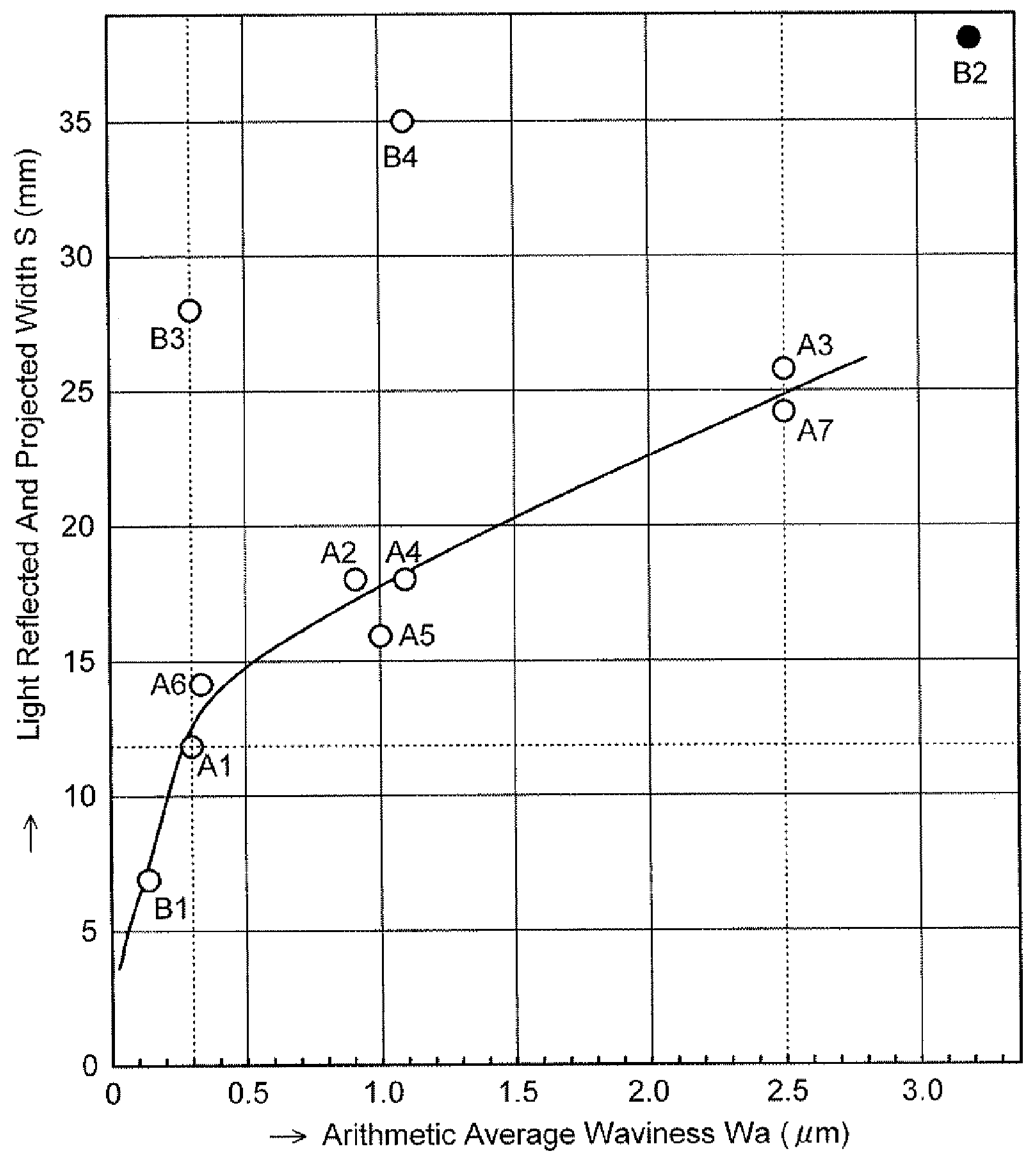
FIG. 5 relates to the light reflecting plate being the first embodiment of the present invention, and is a graph depicting the relationship between the arithmetic average waviness (Wa) of reflecting surface and the projected width (S) of the reflected light in each sample on the table of FIG. 3.

Next, FIG. 5 is a graph illustrating a relationship between the arithmetic average waviness (Wa) and the projected width (S) of the reflected light, which was prepared by using the measurement results of the table of FIG. 3. Figures written in the graph indicate sample numbers.

In FIG. 5, in each sample having 0.1 to 0.3 μm of the arithmetic average roughness (Ra), the projected width (S) of the reflected light rises sharply near 0.2 μm of the arithmetic average waviness (We), and reaches 12 mm or more being an acceptance value at 0.3 μm or more of the arithmetic average waviness (Wa).

On the other hand, in Comparative Examples 3 and 4, the projected width (S) of the reflected light is as large as 28 mm and 35 mm, which is good in reducing glare, but the regular reflectance is less than 88%, in other words, the light transmission efficiency is not good.

Further, Comparative Example 1 having less than 0.1 μm of the arithmetic average roughness (Ra) has high regular reflectance but has less than 12 mm of the projected width (S) of the reflected light, and thus glare is not reduced.

Meanwhile, in Examples 2 and 3 using an aluminum substrate, Example 5 in which the binder layer (acrylic resin) 12 is laid between the substrate 11 and the light reflecting layer 13, and Example 7 using aluminum film as the light reflecting layer 13, sufficiently large projected width (S) of the reflected light can be obtained by setting the surface texture (the arithmetic average roughness (Ra) and the arithmetic average waviness (Wa)) to a predetermined range, and consequently, they have effect of reducing glare.

As described above, according to the light reflecting plate of the embodiment of the present invention, it is equipped with the light reflecting layer 13 made of a film of silver or silver alloy, or a film of aluminum or aluminum alloy, so that it is excellent in reflection efficiency particularly over the entire visible light region.

Further, since the arithmetic average roughness (Ra) of the light reflecting layer 13 surface is as small as 0.10 to 0.30 μm, high light reflectance by regular reflection can be maintained. In addition, since the arithmetic average waviness (Wa) is provide on the surface of the same light reflecting layer 13 and the range of the arithmetic average waviness (Wa) is set to 0.3 to 2.5 μm, diffuse reflection of light can be generated without lowering the light reflectance by regular reflection.

Thus, glare of reflected light can be reduced while maintaining high light reflectance by regular reflection.

(3) Description of the Light Reflecting Device According to the Second Embodiment of the Present Invention

(i) Mirror Duct

Figure 8:
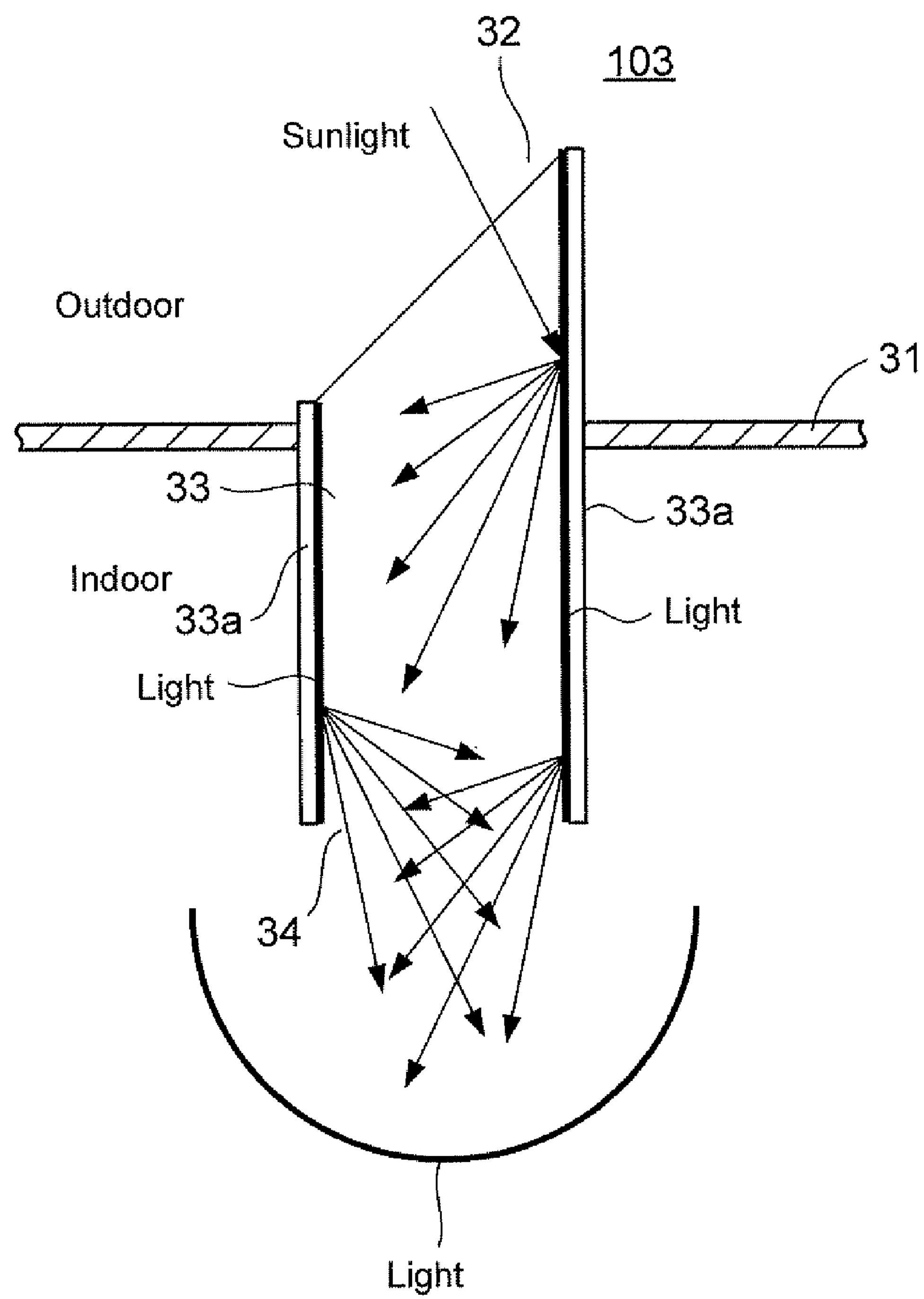
FIG. 8 is a cross-sectional view illustrating the constitution of a mirror duct being an application example of the light reflecting plate according to the second embodiment of the present invention.
Figure 9:
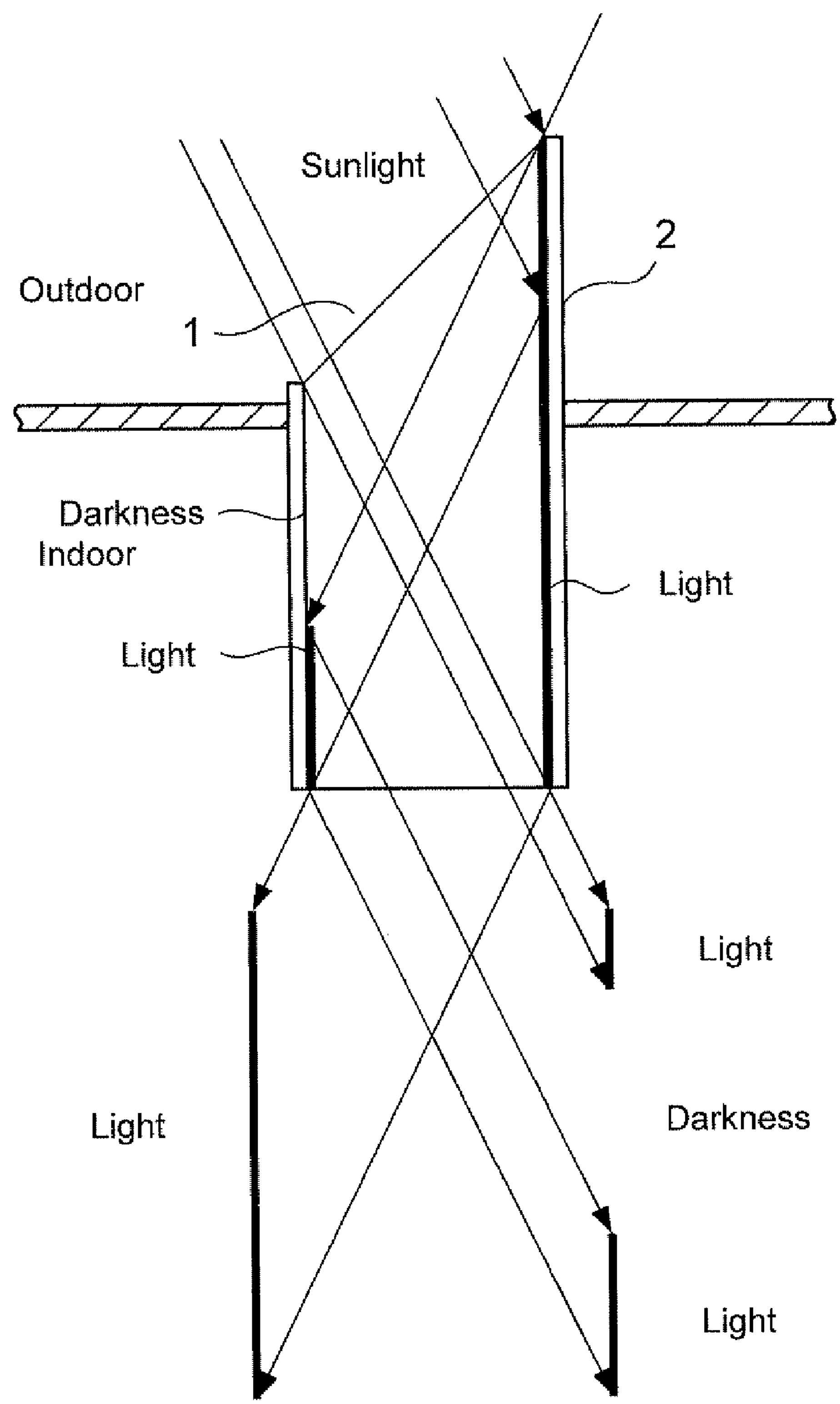
FIG. 9 is a cross-sectional view illustrating the constitution of the mirror duct being a conventional example.

FIG. 8 is a cross-sectional view illustrating the structure of a mirror duct according to the second embodiment of the present invention. FIG. 8 illustrates a mirror duct 103 installed on a roof 31 of a house, which actually partitions indoors and outdoors.

The mirror duct 103 has a daylighting section 32 provided outdoor, a light emitting section 34 provided indoor, and a light guiding section 33 connecting the daylighting section 32 with the light emitting section 34. The inner surface of a partition wall 33*a* of the light guiding section 33 has light reflection surface as illustrated in FIG. 6C.

The partition wall 33*a* is fabricated by using the light reflecting plate 101 illustrated in FIG. 1A or the light reflecting plate 102 illustrated in FIG. 1B. For example, in the case where a relatively thick metal plate or a plastic plate is employed as the substrate 11, the plate itself can be worked into a duct shape such that a light reflecting layer side is used as the inner wall surface, and then installed. On the other hand, in the case where a thin metal plate called a foil, plastic film or the like is employed as the substrate 11, it is adhered onto the inner wall surface of a mirror duct body manufactured by working another member having high rigidity.

According to the mirror duct of this example, because the range of the arithmetic average roughness (Ra) and the arithmetic average waviness (Wa) is appropriately provided on the light reflection surface of the mirror duct inner wall, sunlight ray taken in from the daylighting section 32 can be transmitted by diffusing and reflecting on the inner wall of the mirror duct 103 while maintaining high reflection and transmission efficiency. As illustrated in FIG. 8, since light is transmitted while spreading light ray flux in the mirror duct by diffuse reflection, light ray radiates evenly in the light emitting section 34. Thus, uneven illumination can be prevented and glare of illumination light can be also reduced.

The present invention has been described in detail based on the embodiments, but the range of the present invention is not limited to the examples specifically described in the above embodiments, and changes of the above-described embodiments without departing from the gist of the invention are included in the range of the present invention.

The light reflecting plate of the present invention, by setting the surface texture of the surface of the light reflecting layer, which forms the light reflecting plate, to a predetermined range, can reduce glare of reflected light which has conventionally been a problem while maintaining high light transmission efficiency of regular reflection. By using the light reflecting plate for a mirror duct that leads sunlight or the like as an illumination light source into an unsunny building, basement or the like, uneven illumination is prevented and performance of the mirror duct can be significantly improved.

What is claimed is:

1. A light reflecting plate, comprising:

a base; and a light reflecting layer that is formed on said base and made of silver or silver alloy, or aluminum or aluminum alloy, wherein on the surface of said light reflecting layer, arithmetic average roughness (Ra) is at a range of 0.10 to 0.30 μm and arithmetic average waviness (Wa) is at a range of 0.30 to 2.50 μm.

2. The light reflecting plate according to claim 1, wherein said base is any one of a substrate that is formed by applying galvanization or zinc alloy plating to steel sheet containing iron as a main component and chromium by less than 11%, a stainless steel substrate, a substrate made of aluminum or aluminum alloy, a glass substrate and a plastic substrate.

3. The light reflecting plate according to claim 2, wherein said base has a binder layer formed on the substrate.

4. The light reflecting plate according to claim 3, wherein said binder layer is a film of an organic resin material, an inorganic material, or mixture of the materials.

5. The light reflecting plate according to claim 1, wherein the surface of said light reflecting layer is covered with a protective film.

6. The light reflecting plate according to claim 5, wherein said protective film is a film of an organic resin material, an inorganic material, or mixture of the materials.

7. The light reflecting plate according to claim 5, wherein said protective film is formed of two layers of an organic resin material film and an inorganic material film.

8. A method of manufacturing a light reflecting plate, comprising:

preparing a base having surface texture with arithmetic average roughness (Ra) of 0.10 to 0.30 μm and arithmetic average waviness (Wa) of 0.30 to 2.50 μm; and forming a light reflecting layer made of a film of silver or silver alloy, or aluminum or aluminum alloy on said base by any one of an electrolytic plating method, an electroless plating method and an evaporation method.

9. The method of manufacturing a light reflecting plate according to claim 8, further comprising:

forming a protective film on the light reflecting layer after forming said light reflecting layer.

10. The method of manufacturing a light reflecting plate according to claim 8, wherein said base is formed of any one of a steel sheet substrate, an aluminum substrate, a glass substrate and a plastic substrate, and said arithmetic average roughness (Ra) and arithmetic average waviness (Wa) are imparted on the surface of the substrate in rolling the substrate.

11. The method of manufacturing a light reflecting plate according to claim 8, wherein said base is one that a binder layer is formed on the substrate by a coating method, said arithmetic average roughness (Ra) and arithmetic average waviness (Wa) are imparted on the surface of said binder layer by adjusting a viscosity of coating liquid and an amount of coating liquid in forming the binder layer.

12. A light reflecting device, comprising:

a light reflecting plate including a base, and a light reflecting layer that is formed on said base and made of silver or silver alloy, or aluminum or aluminum alloy, wherein on the surface of said light reflecting layer, arithmetic average roughness (Ra) is at a range of 0.10 to 0.30 μm and arithmetic average waviness (Wa) is at a range of 0.30 to 2.50 μm.

13. The light reflecting device according to claim 12, wherein said light reflecting device is a mirror duct having a daylighting section, a light guiding section and a light emitting section, and said light reflecting plate is provided on the inner wall of said light guiding section.

14. A light reflecting device, comprising:

said light reflecting plate manufactured by the manufacturing method of a light reflecting plate according to claim 8.

15. The light reflecting device according to claim 14, wherein said light reflecting device is a mirror duct having a daylighting section, a light guiding section and a light emitting section, and said light reflecting plate is provided on the inner wall of said light guiding section.

* * * * *